(12) United States Patent
Torabi

(10) Patent No.: US 7,594,067 B2
(45) Date of Patent: Sep. 22, 2009

(54) ENHANCED DATA ACCESS IN A STORAGE DEVICE

(75) Inventor: Hooshmand Torabi, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 513 days.

(21) Appl. No.: 11/582,462

(22) Filed: Oct. 18, 2006

(65) Prior Publication Data

US 2007/0094440 A1    Apr. 26, 2007

Related U.S. Application Data

(60) Provisional application No. 60/728,856, filed on Oct. 20, 2005.

(51) Int. Cl.
*G06F 12/00* (2006.01)
(52) U.S. Cl. .................. 711/103; 711/203
(58) Field of Classification Search .......... None
See application file for complete search history.

(56) References Cited

U.S. PATENT DOCUMENTS

| | | | | |
|---|---|---|---|---|
| 7,242,632 B2 * | 7/2007 | Hiraka | .................. | 365/230.03 |
| 7,487,303 B2 * | 2/2009 | Song et al. | .................. | 711/103 |
| 2006/0062041 A1 * | 3/2006 | Hiraka | .................. | 365/145 |
| 2006/0143365 A1 * | 6/2006 | Kikuchi | .................. | 711/103 |
| 2006/0179263 A1 * | 8/2006 | Song et al. | .................. | 711/170 |
| 2007/0016721 A1 * | 1/2007 | Gay | .................. | 711/103 |
| 2007/0043900 A1 * | 2/2007 | Yun | .................. | 711/103 |
| 2008/0013380 A1 * | 1/2008 | Cornwell et al. | .................. | 365/185.21 |
| 2008/0034153 A1 * | 2/2008 | Lee et al. | .................. | 711/103 |
| 2008/0034154 A1 * | 2/2008 | Lee et al. | .................. | 711/103 |
| 2008/0228995 A1 * | 9/2008 | Tan et al. | .................. | 711/103 |
| 2008/0263061 A1 * | 10/2008 | Nath et al. | .................. | 707/100 |
| 2008/0270680 A1 * | 10/2008 | Chang | .................. | 711/103 |

* cited by examiner

*Primary Examiner*—Kevin Verbrugge
(74) *Attorney, Agent, or Firm*—McDermott Will & Emery LLP

(57) ABSTRACT

A flash storage device having improved write performance is provided. The device includes a storage block having a plurality of physical pages and a controller for mapping the plurality of physical pages to a plurality of logical addresses and for writing data to the plurality of physical pages. When updating data previously written to one of the plurality of logical addresses, the controller is configured to write the updated data to a second physical page which is mapped to the logical address. Each of the logical addresses may be associated with a pointer field, which is for storing a pointer value indicating the invalidity of a physical page and/or the location of another physical page.

21 Claims, 6 Drawing Sheets

| Logical Address | Physical Page |
|---|---|
| 3000 | 00 |
| | 01 |
| | 02 |
| | 03 |
| 3001 | 04 |
| | 05 |
| | 06 |
| | 07 |
| 3002 | 08 |
| | 09 |
| | 10 |
| | 11 |
| 3003 | 12 |
| | 13 |
| | 14 |
| | 15 |
| . | . |
| . | . |
| . | . |
| . | . |
| . | . |
| . | . |
| 3015 | 60 |
| | 61 |
| | 62 |
| | 63 |

| Physical Page | Invalid |
|---|---|
| 00 | x |
| 01 | x |
| 02 | |
| 03 | |
| 04 | x |
| 05 | |
| 06 | |
| 07 | |
| 08 | x |
| 09 | x |
| 10 | x |
| 11 | |
| 12 | |
| 13 | |
| 14 | |
| 15 | |
| . | . |
| . | . |
| . | . |
| . | . |
| . | . |
| . | . |
| 60 | |
| 61 | |
| 62 | |
| 63 | |

| 00 |
| --- |
| 01 |
| 02 |
| 03 |
| 04 |
| 05 |
| 06 |
| 07 |
| 08 |
| 09 |
| 10 |
| 11 |
| 12 |
| 13 |
| 14 |
| 15 |
| . |
| . |
| . |
| . |
| . |
| . |
| . |
| . |
| 60 |
| 61 |
| 62 |
| 63 |

Figure 3A

| Logical Address | Physical Page |
|---|---|
| 3000 | 00 |
| | 01 |
| | 02 |
| | 03 |
| 3001 | 04 |
| | 05 |
| | 06 |
| | 07 |
| 3002 | 08 |
| | 09 |
| | 10 |
| | 11 |
| 3003 | 12 |
| | 13 |
| | 14 |
| | 15 |
| ⋮ | ⋮ |
| 3015 | 60 |
| | 61 |
| | 62 |
| | 63 |

Figure 3B

| Physical Page | Invalid |
|---|---|
| 00 | x |
| 01 | x |
| 02 | |
| 03 | |
| 04 | x |
| 05 | |
| 06 | |
| 07 | |
| 08 | x |
| 09 | x |
| 10 | x |
| 11 | |
| 12 | |
| 13 | |
| 14 | |
| 15 | |
| ⋮ | ⋮ |
| 60 | |
| 61 | |
| 62 | |
| 63 | |

Figure 5A

| Logical Address | Physical Page |
|---|---|
| 6000 | 00 |
| 6001 | 01 |
| 6002 | 02 |
| 6003 | 03 |
| 6004 | 04 |
| 6005 | 05 |
| 6006 | 06 |
| 6007 | 07 |
| 6008 | 08 |
| 6009 | 09 |
| 6010 | 10 |
| 6011 | 11 |
| 6012 | 12 |
| 6013 | 13 |
| 6014 | 14 |
| 6015 | 15 |
| ⋮ | ⋮ |
| 6059 | 59 |
|  | 60 |
|  | 61 |
|  | 62 |
|  | 63 |

Figure 5B

| Logical Address | Pointer |
|---|---|
| 6000 | 00 |
| 6001 | 01 |
| 6002 | 02 |
| 6003 | 03 |
| 6004 | 04 |
| 6005 | 05 |
| 6006 | 06 |
| 6007 | 07 |
| 6008 | 08 |
| 6009 | 09 |
| 6010 | 10 |
| 6011 | 11 |
| 6012 | 12 |
| 6013 | 13 |
| 6014 | 14 |
| 6015 | 15 |
| ⋮ | ⋮ |
| 6059 | 59 |

ENHANCED DATA ACCESS IN A STORAGE DEVICE

CROSS-REFERENCE TO RELATED APPLICATION

The present application claims the benefit of priority under 35 U.S.C. §119 from U.S. Provisional Patent Application Ser. No. 60/728,856 entitled "SYSTEM AND METHOD FOR DATA ACCESS IN A MEMORY DEVICE," filed on Oct. 20, 2005, the disclosure of which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to computer storage devices and, in particular, relates to data access in a flash storage device.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

Current flash storage devices suffer from a number of limitations. Although flash memory can be read or written at the physical page level, it can only be erased or rewritten at the block level. Beginning with a pre-erased block, data can be written to any physical page within that block. However, once data has been written to a physical page, the contents of that physical page cannot be changed until the entire block containing that physical page is erased. In other words, while flash memory can support random-access read and write operations, it can not support random-access rewrite or erase operations.

Generally, a flash storage device is comprised of large physical blocks that are optimized for large block sequential data transfer. Consequently, there is considerable overhead in the block carry-over and garbage collection which adversely impact write performance. As the density of a flash storage device increases, the number of blocks is increased, resulting in even more overhead and lower performance for write operations.

Accordingly, there is a need for improved memory controllers and memory management methods to improve the write performance of flash storage devices. The present invention satisfies this need and provides other advantages as well.

SUMMARY OF THE INVENTION

In accordance with the present invention, a flash storage device is provided with a controller and a storage block having a plurality of physical pages. The controller maps the physical pages to logical addresses. When the data for a logical address needs updating, rather than performing a block carry-over and writing all of the physical pages of the block, including the updated physical page, to a new block, the controller invalidates the current physical page and writes the updated data to another physical page. After a predetermined number of available physical pages have been written, a block carry-over is performed. By reducing the number and frequency of overhead-consuming block carry-overs, the write performance of a flash storage device of the present invention is greatly improved.

According to one aspect, the present invention is a flash storage device including a storage block having a plurality of physical pages, and a controller for mapping the plurality of physical pages to a plurality of logical addresses and for writing data to the plurality of physical pages. When updating data previously written to one of the plurality of logical addresses, the controller is configured to invalidate a first physical page mapped to the logical address and to write updated data to a second physical page which is mapped to the logical address.

According to another aspect, a flash storage device of the present invention includes a storage block having a plurality of physical pages, and a controller for mapping the plurality of physical pages to a plurality of logical addresses and for writing data to the plurality of physical pages. Each of the plurality of logical addresses is associated with a pointer field. When updating data previously written to one of the plurality of logical addresses, the controller is configured to store a pointer value in the pointer field associated with the logical address. The pointer value indicates the invalidity of the first physical page and a location of a second physical page. The controller is further configured to write updated data to the second physical page.

According to yet another aspect, the present invention is a method for managing memory operations in a flash storage device. The method includes the step of mapping a plurality of physical pages in a storage block to a plurality of logical addresses The method further includes the steps of receiving a write command for one of the plurality of logical addresses, invalidating a first physical page mapped to the logical address, and writing updated data to a second physical page which is mapped to the logical address.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 2 depicts a partial block diagram of a flash storage device according to one aspect of the present invention;

FIGS. 3A and 3B illustrate an example of a static multi-page allocation of physical pages in a flash storage device according to another aspect of the present invention;

FIGS. 5A and 5B illustrate an example of a dynamic multi-page allocation of physical pages in a flash storage device according to yet another aspect of the present invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
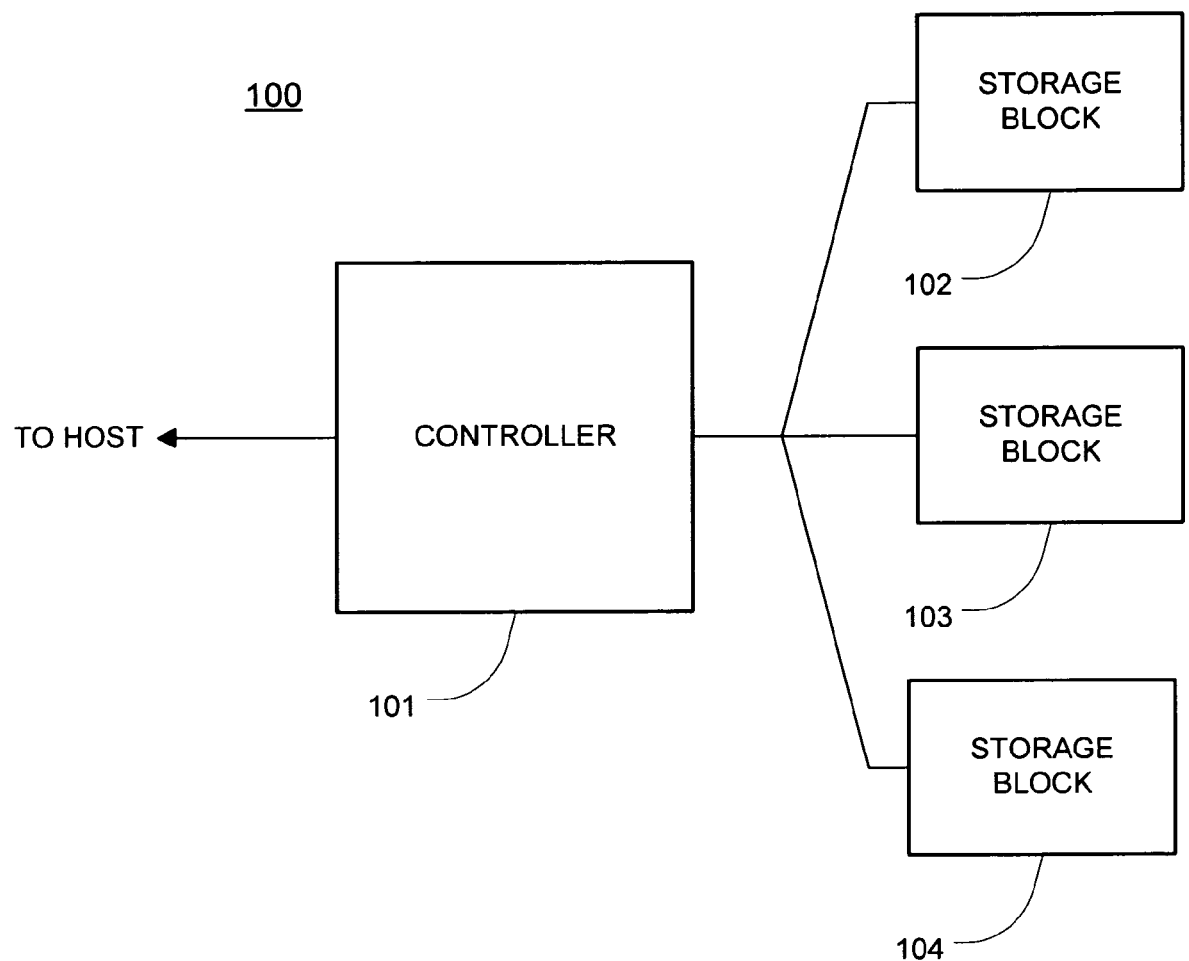
FIG. 1 depicts a block diagram of a flash storage device according to one embodiment of the present invention.

Referring to FIG. 1, a block diagram of a flash storage device according to one embodiment of the present invention is depicted. Flash storage device 100 includes a controller 101 and one or more storage blocks, such as storage blocks 102, 103 and 104. FIG. 2 depicts a block diagram of storage block 102 in further detail. Storage block 102 has a plurality of physical pages 00-63 for storing data. Controller 101 is programmed to map physical pages 00-63 to a plurality of logical addresses. While the term "storage block" is used throughout the description of the present invention, it will be understood by those of skill in the art that the term storage block is frequently used interchangeably with the term "memory block" in the art.

In the following description, each physical page will be treated as containing one sector for data storage. As will be apparent to one skilled in the art, the present invention has application to flash storage devices in which physical pages contain more than one sector. For example, according to one embodiment of the present invention, each physical page of a flash storage device contains four sectors for data storage. Other systems within the scope of the present invention may have fewer than or more than four sectors per page.

According to one aspect of the present invention, multiple physical pages within a storage block are allocated to each logical address. In this embodiment of the invention, the number of physical pages allocated to each logical address is static. Accordingly, this approach is referred to as static multi-page allocation. FIG. 3A illustrates an example of such a static multi-page allocation of physical pages in storage block 102, in which physical pages 00-03 are mapped to logical address 3000, physical pages 04-07 are mapped to logical address 3001, physical pages 08-11 are mapped to logical address 3002, physical pages 12-15 are mapped to logical address 3003, and so on through physical pages 60-63, which are mapped to logical address 3015.

In the present exemplary embodiment, the allocation of physical pages to logical addresses occurs at the time of flash initialization. The scope of the present invention is not limited to this arrangement, however. In other embodiments, the allocation of physical pages to logical addresses may occur at run-time or at any other time. In some embodiments, the allocation of physical pages to logical addresses may occur at initialization, and may then be modified or continued during run-time or any time after initialization.

The first of the multiple physical pages allocated for a particular logical address is used to store data in response to a first write request for that logical address. For example, in FIG. 3A, physical page 00 is used to store data in response to a first write request for logical address 3000. For subsequent data updates (e.g., rewrites or subsequent write requests) to the same logical address, one or more of the remaining allocated physical pages are used to store the updated data, and the previous physical page with the old data is invalidated. For example, upon a second write request for logical address 3000, physical page 01 is used to store the updated data, and physical page 00 is invalidated. This process may be repeated as often as there are sufficient remaining physical pages allocated to the logical address. Multiple updates to a logical address are therefore possible without the need for a block-carry over to a new pre-erased storage block. In a system without this multiple page allocation, any data update to the contents of a physical page triggers a block carry-over or "garbage collection" routine, which slows the performance of the flash storage device.

The invalidation of a physical page can be accomplished in a number of ways. According to one aspect, an index in the form of a table contains data associating physical pages with invalid fields. To invalidate a physical page, the invalid field associated with that physical page is modified to contain an invalid flag. FIG. 3B illustrates such a table associating the physical pages 00-63 of storage block 102 with invalid fields.

An index for associating physical pages with invalid fields may be kept in volatile memory or in non-volatile memory, either inside or outside of the flash storage device. It will be apparent to one of skill in the art that an index associating physical pages with invalid fields need not be configured as a table, and may further be kept in any number of locations, within the scope of the present invention. While FIGS. 3A and 3B illustrate two different tables for allocating physical pages and associating physical pages with invalid fields, it will be apparent to one of skill in the art that these two tables need not necessarily be separate, and could be combined into one table, within the scope of the present invention.

While the present explanation has illustrated the application of the present invention to a storage block having 64 physical pages, it will be apparent to one of skill in the art that storage blocks having different numbers of physical pages, for example 128 or 256, may be used within the scope of the present invention.

Figure 4:
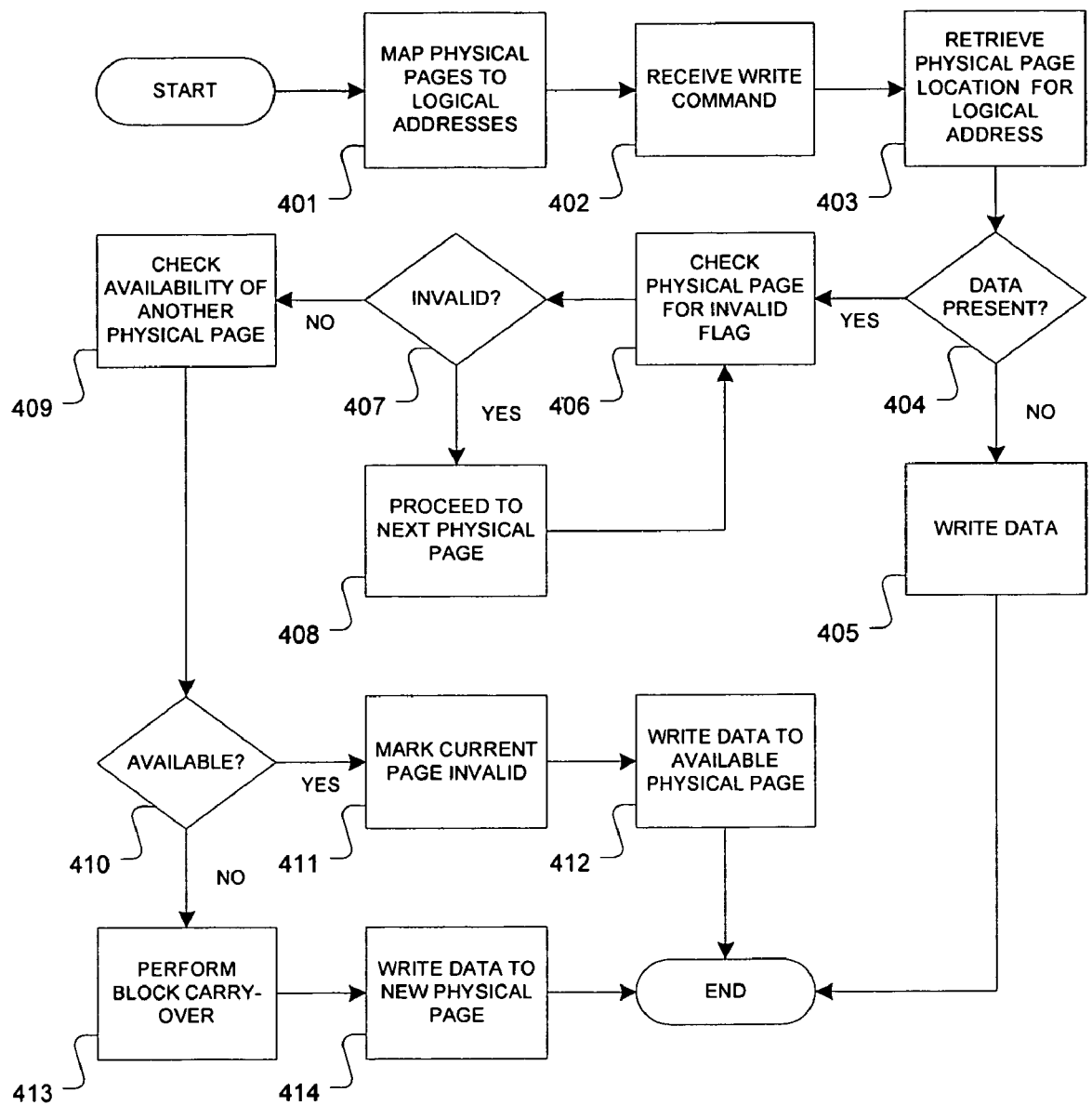
FIG. 4 is a flowchart depicting a method for managing memory operations in a flash storage device according to another aspect of the present invention.

FIG. 4 is a flowchart depicting a method for managing memory operations in a flash storage device according to one embodiment of the present invention. The method includes the step of mapping a plurality of physical pages in a storage block to a plurality of logical addresses. The method further includes the steps of receiving a write command for one of the plurality of logical addresses, invalidating a current physical page mapped to the logical address, and writing updated data to another physical page which is mapped to the logical address.

The method may be applied to a flash storage block using the static multi-page allocation of FIG. 3A as described more fully herein. In step 401, a plurality of physical pages in a storage block, such as storage block 102, are mapped to a plurality of logical addresses. For example, controller 101 is programmed to map (e.g., allocate) four physical pages within storage block 102 for each logical address. Physical pages 00-03 are mapped to logical address 3000, physical pages 04-07 are mapped to logical address 3001, physical pages 08-11 are mapped to logical address 3002, physical pages 12-15 are mapped to logical address 3003, and so on through physical pages 60-63, which are mapped to logical address 3015. Accordingly, the number of physical pages in storage block 102 is greater than the number of logical addresses mapped to storage block 102.

After a write command is received in step 402, the process proceeds to step 403, in which the process retrieves the location of a physical page mapped to the logical address for which a write is required. In the example embodiment illustrated in FIG. 3A, when data is received for logical address 3003, controller 101 retrieves the location of physical page 12. If no data has yet been written to physical page 12, then the data is written to physical page 12, as shown in steps 404 and 405, and the process terminates.

If, however, data is already present in the currently considered physical page, then the controller checks for an invalidity condition of that physical page. For example, in the present exemplary embodiment, the controller checks an invalid field associated with that physical page for an invalid flag, as shown in steps 404 and 406. An index for associating physical pages with invalid fields may be kept in volatile memory or in non-volatile memory, either inside or outside of the flash storage device. If the physical page has been marked invalid, then the process proceeds to the next physical page, as shown in steps 407 and 408. This process continues until a physical page with data which has not been marked invalid is located. For example, if logical address 3000 receives a write request, controller 101 examines physical page 00, which has been marked with an invalid flag, as illustrated in FIG. 3B, so controller 101 proceeds to the next physical page, physical page 01, and again checks for an invalid flag. Finding an invalid flag invalidating physical page 01, controller 101 proceeds to page 02, where no invalid flag is found.

In other embodiments of the present invention, the controller may check an associated pointer field for a pointer value indicating the invalidity of the current physical page. The pointer value may indicate the invalidity of the current physical page by pointing to the next available page. Accordingly, in such an embodiment, the controller may not be required to iteratively check each physical page allocated to a logical address for validity. Rather, the first physical page allocated to the logical address may contain a pointer field which is updated after each write to the logical address, so that the pointer value in the pointer field points to the next available physical page, if available.

When a physical page without an invalid flag is found, the storage block is checked to see if another physical page is available for the write operation in step 409. If another physical page is available, the current physical page is marked with an invalid flag in step 411, data is written to the available physical page in step 412, and the process terminates. Thus, in the example illustrated in FIG. 3B, having found physical page 02 to have no invalid flag, controller 101 checks to see if another physical page is available. Finding physical page 03 available for data, controller 101 invalidates physical page 02 by marking it with an invalid flag, and writes the data to physical page 03.

While the present exemplary embodiment has described the controller as invalidating physical page 02 by marking it with an invalid flag, the scope of the present invention is not limited to this arrangement. The invalidation of a physical page may be accomplished by any one of a number of invalidation techniques apparent to those of skill in the art, such as, for example, including the invalid page in a table of invalid pages, associating a pointer with the invalid page, and the like.

While the present exemplary embodiment has described the invalidation of a current physical page occurring before the controller writes data to another physical page, the scope of the present invention is not limited to this particular order. In an alternate embodiment of the present invention, the controller may write data to another physical page before invalidating the previous physical page.

If, however, controller 101 finds that no other physical page is available, a block carry-over is performed in step 413, the data is written to a physical page in a new storage block in step 414, and the process terminates. In FIG. 3B, logical address 3002 has already been written and updated three times, so if a rewrite for logical address 3002 were required, a block carry-over would be triggered.

In a block carry-over, the valid data stored in each physical page is copied to a new physical page in another storage block. These new physical pages are then mapped to the logical addresses to which the original physical pages were mapped. The previous storage block may be marked for deletion, which may occur immediately, or may be delayed to prevent the deletion operation from interfering with ongoing data transfer operations.

In the present exemplary embodiment of FIG. 3A, in which physical pages are mapped (e.g. allocated) to logical address in a 4:1 ratio, data can be written to a logical address once and updated three times before a block carry-over operation is triggered. It will be apparent to one skilled in the art that the present invention is not limited to static multi-page allocations having a ratio of four physical pages to one logical address, and that a static multi-page allocation with nearly any ratio, such as, by way of example and without limitation, 2:1, 8:1, 16:1, may be implemented within the scope of the present invention. In another embodiment, different portions of a single flash storage device may have different ratios. For example, some portions may have a 4:1 ratio, while others may have an 8:1 ratio, or the like.

In a flash storage device utilizing a static multi-page allocation of physical pages, the controller may respond to a read request by first retrieving the location of a physical page mapped to a logical address, then checking the physical page for invalidity (e.g., an invalid flag). If the physical page is invalid, the process proceeds to the next appropriate physical page, and the process repeats until a valid physical page is found, and the data is read. If no valid physical page is found, an indicator of a read error, such as an error message, may be returned.

According to another embodiment of the present invention, physical pages are dynamically allocated to updated logical addresses in a storage block. A plurality of physical pages are allocated to a plurality of logical addresses. Each logical address is associated with a pointer field, in which a pointer value is stored, the pointer value indicating the physical page currently allocated to that logical address. Not all of the physical pages are allocated at one time, however. Multiple physical pages in a storage block are reserved for future data updates, i.e., they are not initially allocated to any particular logical address. According to this embodiment, the first logical address requiring updated data is accommodated by one of the physical pages reserved for this purpose. In this approach, termed dynamic multi-page allocation, multiple updates to any logical address in the storage block are possible without the need for a block-carry over to a new pre-erased storage block.

Logical addresses may be associated with pointer fields in a number of ways. According to one aspect, an index in the form of a table contains data associating logical addresses pages with pointer fields. Pointer fields may contain pointer values expressed as physical page locations, offset values, and the like. The table may be kept in volatile memory or in non-volatile memory, either inside or outside of the flash storage device. FIG. 5B illustrates one example of such a table for associating logical addresses to pointer fields according to one aspect of the present invention. It will be apparent to one of skill in the art that an index associating logical addresses with pointer fields need not be configured as a table, and may be kept in any number of locations, within the scope of the present invention.

When an update is made to a logical address, the pointer field associated with that logical address is updated to point to one of the reserved physical pages, which is used to store the updated data. When the controller subsequently receives a read request for that logical address, the pointer field associated with that logical address is checked for a pointer value, to determine in which physical page the data is stored. This process may be repeated for each subsequent data update for that logical address, or for any logical address in the same storage block, allowing multiple updates to any logical address in the storage block without the need for a block-carry over to a new pre-erased storage block.

Turning again to FIG. 2, a dynamic multi-page allocation of physical pages in a flash storage device may be illustrated with storage block 102. Storage block 102 contains multiple physical pages, such as physical pages 00-63. Controller 101 is programmed to map (e.g. allocate) some physical pages to logical addresses, and to reserve other physical pages for future data updates. This dynamic multi-page allocation of physical pages in a flash storage device is illustrated in FIG. 5A, in which physical pages 00-59 are initially mapped to logical addresses 6000-6059, respectively, and physical pages 60-63 are initially reserved for data updates.

Figure 6:
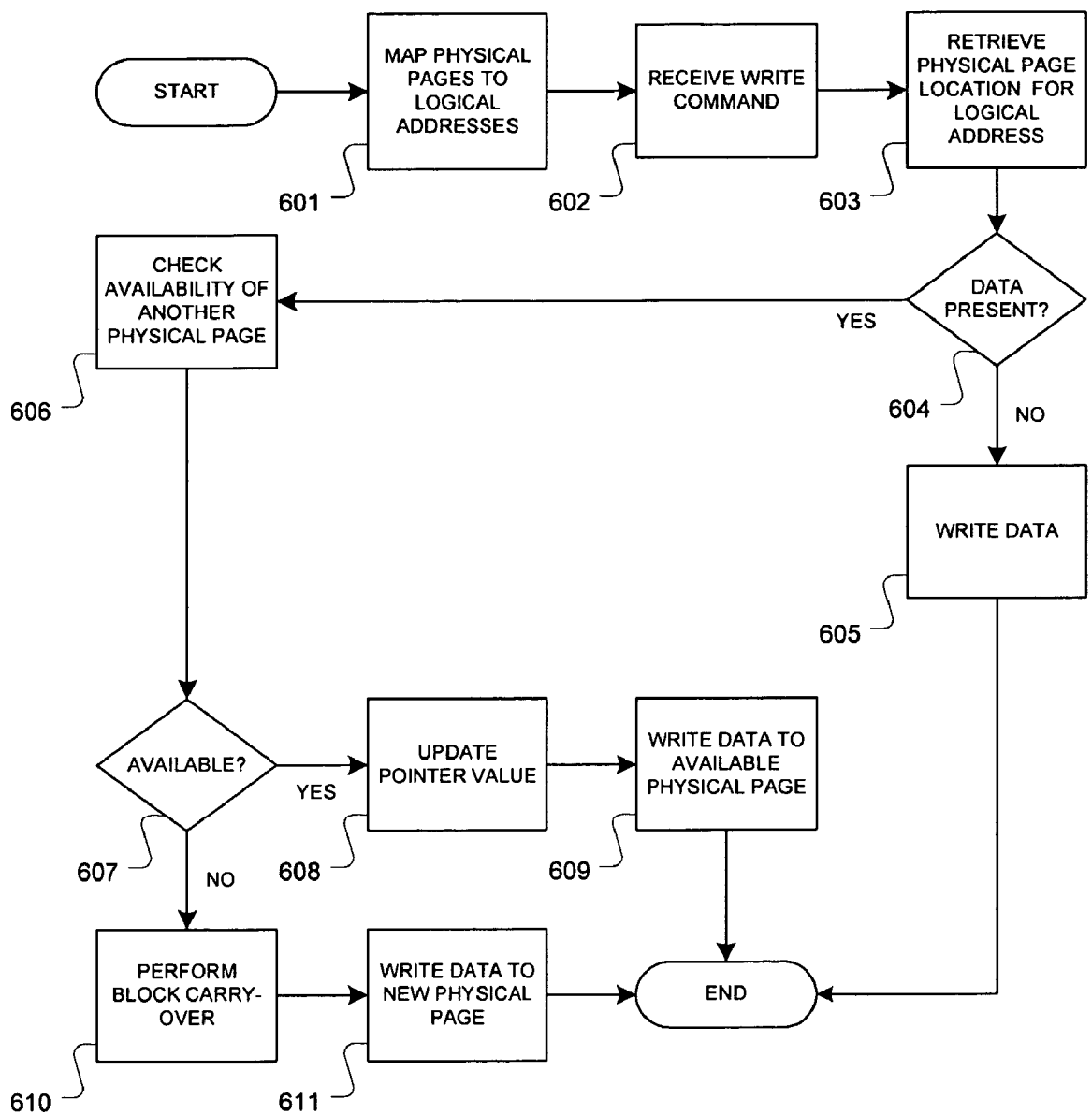
FIG. 6 is a flowchart depicting a method for managing memory operations in a flash storage device according to another aspect of the present invention.

Turning to FIG. 6, a method for managing memory operations in a flash storage device may be applied to a flash storage device using a dynamic multi-page allocation. The method may be applied to a flash storage block using the dynamic multi-page allocation of FIG. 5A as described more fully herein. In step 601, a plurality of physical pages in a storage block, such as storage block 102, are mapped to a plurality of logical addresses. For example, in a flash storage device using the dynamic multi-page allocation of FIG. 5A, controller 101 is programmed to map (e.g., allocate) physical pages 00-59 within storage block 102 to logical address 6000-6059, respectively, while reserving physical pages 60-63 for data updates. Accordingly, the number of physical pages in storage block 102 is greater than the number of logical addresses mapped to storage block 102.

After a write command is received for a logical address in step 602, the process proceeds to step 603, in which controller 101 retrieves the location of a physical page mapped to the logical address for which a write is required. The controller retrieves the location of the currently mapped physical page by reading a pointer value in a pointer field associated with the logical address. In the example embodiment illustrated in FIG. 5A, when data is received for logical address 6001, controller 101 retrieves the location of physical page 01. If no data has yet been written to physical 01, then the data is written to physical page 01 as shown in steps 604 and 605, and the process terminates. In some embodiments, the pointer value may be an offset value, or any other value which can be used to determine the location of a physical page.

If, however, data is already present in the currently considered physical page, then the controller checks to see if another physical page is available in the storage block for the write operation in step 606. If another physical page is available, controller 101 stores an updated pointer value in the pointer field associated with the current logical address, thereby invalidating the previous physical page, as shown in steps 607 and 608, data is written to the available physical page in step 609, and the process terminates. For example, if logical address 6002 receives a write request, and controller 101 determines that physical page 02 contains data, controller 101 checks to see if any of physical pages 60 to 63 are available for data. If physical page 60 is available for data, controller 101 updates the pointer value associated with logical address 6002 to reflect that data for that logical address is now being stored in physical page 60 and writes the updated data to physical page 60.

While the present exemplary embodiment has described the updating of a pointer value associated with a logical address as occurring before the controller writes data to another physical page, the scope of the present invention is not limited to this particular order. In an alternate embodiment of the present invention, the controller may write data to another physical page before updating the pointer value.

In the exemplary embodiment illustrated in FIGS. 5A and 5B, when a write request to update data stored in logical address 6001 is received, controller 101 determines whether any physical pages in storage block 102 are still available for allocation. Finding that physical page 60 is still available, controller 101 writes the updated data to physical page 60 and updates the pointer value associated with logical address 6001 to indicate physical page 60 instead of physical page 01, thereby invalidating physical page 01 and mapping physical page 60 to logical address 6001.

While FIGS. 5A and 5B illustrate two different tables for allocating physical pages and associating logical addresses with pointer fields, it will be apparent to one of skill in the art that these two tables need not necessarily be separate, and could be combined into one table, within the scope of the present invention. For example, the mapping of a physical page to a logical address could be accomplished by modifying a pointer field to include a pointer value that indicates the physical page that is allocated or mapped to that logical address.

Logical addresses may be associated with physical pages in a number of ways. According to one aspect, an index for associating logical addresses with pointer fields may be kept in volatile memory or in non-volatile memory, either inside or outside of the flash storage device. It will be apparent to one of skill in the art that an index associating logical addresses with pointer fields need not be configured as a table, and may be kept in any number of locations, within the scope of the present invention.

A pointer value in a pointer field associated with a logical address may indicate the location of a physical page in any one of a number of ways. For example, the pointer value may be the physical address of a physical page, or it may be analogous to a table index value, which the controller translates into the location of another physical page by looking up the index value in an address table in which the physical address of another physical page is stored. By including a short index value rather than the entire physical address of another physical page, the controller can conserve more space for data storage. It will be apparent to one of skill in the art that the present invention is not limited to pointer values which are physical addresses or table index values, but may encompass any pointer value, or any other indicator, such as an offset value, which indicates the location of another physical page.

If, in response to a write request, controller 101 finds that no other physical page is available in storage block 102, a block carry-over is performed in step 607, the data is written to a physical page in a new storage block in step 608, and the process terminates. In FIG. 5A, for example, once all of physical pages 60-63 have been used to store data, a rewrite for any of the logical addresses 6000-6059 would trigger a block carry-over. In other embodiments, a block carry-over may not be performed, or may be performed at a later time. For example, instead of a block carry-over, the controller may return an error message or another message indicating that a carry-over may need to be performed.

While the present exemplary embodiments have depicted a flash storage device in which four physical pages have been reserved for future data updates, it will be apparent to one skilled in the art that any number of physical pages, such as, for example, 1, 2, 3, 8, 12 or 16, may be reserved within the scope of the present invention. In another embodiment, different storage blocks within a single flash storage device may have different numbers of reserved physical pages. For example, some storage blocks may have 4 reserved physical pages, while others may have a 8, or the like. In still other embodiments, storage blocks may be divided into units other than a physical page. The scope of the present invention is not limited to storage blocks which are divided into physical pages, but rather includes storage blocks which are divided into any other kinds of units, as will be apparent to one of skill in the art.

While the present exemplary embodiment has described a flash storage device in which the reserved physical pages are in the same storage block as the physical pages initially mapped to the logical addresses, it will be apparent to one skilled in the art that the reserved physical pages may be in another storage block.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A flash storage device comprising:
   a storage block having a plurality of physical pages; and
   a controller for mapping the plurality of physical pages to a plurality of logical addresses and for writing data to the plurality of physical pages,
   wherein, when updating data previously written to one of the plurality of logical addresses, the controller is configured:
   to invalidate a first physical page mapped to the logical address, and
   to write updated data to a second physical page which is mapped to the logical address wherein the second physical page is located in the storage block in which the first physical page is located.

2. The flash storage device according to claim 1, wherein the number of physical pages is greater than the number of logical addresses.

3. The flash storage device according to claim 1, wherein more than one of the plurality of physical pages are allocated to each of the plurality of logical addresses.

4. The flash storage device according to claim 1, wherein the controller maps the second physical page to the logical address upon flash initialization.

5. The flash storage device according to claim 1, wherein the controller maps the second physical page to the logical address after receiving a data update for the logical address.

6. The flash storage device according to claim 1, wherein to invalidate the first physical page mapped to the logical address, the controller is configured to store a pointer value in a pointer field associated with the first physical page, the pointer value indicating the invalidity of the first physical page and the location of the second physical page.

7. The flash storage device according to claim 1, wherein to invalidate the first physical page mapped to the logical address, the controller is configured to store a pointer value in a pointer field associated with the logical address, the pointer value indicating the invalidity of the first physical page and the location of the second physical page.

8. The flash storage device according to claim 1, wherein the controller is configured to perform a block carry-over when no other physical pages in the storage block are available to store updated data for the logical address.

9. A flash storage device comprising:
   a storage block having a plurality of physical pages; and
   a controller for mapping the plurality of physical pages to a plurality of logical addresses and for writing data to the plurality of physical pages,
   wherein each of the plurality of logical addresses is associated with a pointer field, and
   wherein, when updating data previously written to one of the plurality of logical addresses, the controller is configured:
   to store a pointer value in the pointer field associated with the logical address, the pointer value indicating the invalidity of the first physical page and a location of a second physical page, and
   to write updated data to the second physical page.

10. The flash storage device of claim 9, wherein the pointer value comprises an offset value.

11. The flash storage device of claim 9, wherein the second physical page is located in a different storage block than the first physical page.

12. The flash storage device of claim 9, wherein the second physical page is located in the storage block in which the first physical page is located.

13. The flash storage device of claim 9, wherein the storage block includes one or more physical pages which are not initially allocated to any logical address.

14. The flash storage device of claim 9, wherein the controller is configured to determine a location of a physical page based on a pointer value.

15. The flash storage device of claim 9, wherein the controller is configured to perform a block carry-over when no other physical pages in the storage block are available to store updated data for a logical address.

16. A method for managing memory operations in a flash storage device, the method comprising:
   mapping a plurality of physical pages in a storage block to a plurality of logical addresses;
   receiving a write command for one of the plurality of logical addresses;
   invalidating a first physical page mapped to the logical address; and
   writing updated data to a second physical page which is mapped to the logical address wherein the second physical page is located in the storage block in which the first physical page is located.

17. The method of claim 16, wherein the number of physical pages is greater than the number of logical addresses.

18. The method of claim 16, wherein the second physical page is mapped to the logical address upon flash initialization.

19. The method of claim 16, wherein the second physical page is mapped to the logical address prior to writing updated data to the second physical page.

20. The method of claim 16, wherein invalidating the first physical page includes storing a pointer value in a pointer field associated with the first physical page, the pointer value indicating the location of the second physical page.

21. The method of claim 16, further comprising performing a block carry-over when no other physical pages in the storage block are available to store updated data for a logical address.

* * * * *